United States Patent [19]

Asagiri et al.

[11] Patent Number: 4,664,334
[45] Date of Patent: May 12, 1987

[54] TENSION APPARATUS

[75] Inventors: Katsuki Asagiri; Takashi Kawaharazaki, both of Aichi, Japan

[73] Assignee: Kabushiki Kaisha Toka-rika-denki-seisakusho, Aichi, Japan

[21] Appl. No.: 844,586

[22] Filed: Mar. 27, 1986

[30] Foreign Application Priority Data

Mar. 29, 1985 [JP] Japan .............................. 60-46259[U]

[51] Int. Cl.⁴ ........................................... B60R 22/46
[52] U.S. Cl. .................................... 242/107; 280/806
[58] Field of Search .......... 242/107, 107.4 R–107.4 E, 242/107.5; 280/803, 806, 807; 297/475–478

[56] References Cited

U.S. PATENT DOCUMENTS

| | | |
|---|---|---|
| 4,546,934 | 10/1985 | Nishimura et al. ................ 242/107 |
| 4,579,294 | 4/1986 | Sakakibara et al. ................ 242/107 |
| 4,585,184 | 4/1986 | Kawaguchi et al. ............... 242/107 |
| 4,592,520 | 6/1986 | Kawaguchi ........................ 242/107 |

Primary Examiner—John M. Jillions
Attorney, Agent, or Firm—Sixbey, Friedman & Leedom

[57] ABSTRACT

A tension apparatus for tensing a webbing of a seatbelt system for a vehicle in an emergency situation of the vehicle, thereby allowing the webbing to be tightly fitted to the occupant's body. When an emergency situation of the vehicle occurs, a relatively large spiral spring for rotating a webbing take-up shaft with a relatively strong force so that the webbing is wound up is connected to a worm wheel. A worm which is subjected to a force for winding up the large spiral spring is movable between a position at which it is engaged with the worm wheel and a position at which it is separated therefrom. Accordingly, the worm is engaged with the worm wheel only when the large spiral spring is to be wound up, and there is no risk of the worm obstructing the operation of the large spiral spring at the time of an emergency situation of the vehicle.

20 Claims, 9 Drawing Figures

TENSION APPARATUS

BACKGROUND OF THE INVENTION

1. Field of the Invention

The present invention relates to a tension apparatus for applying tension to an occupant restraining webbing in an emergency situation of a vehicle, thereby tightly restraining the occupant's body by the webbing.

2. Description of the Related Art

In a typical seatbelt system for a vehicle which is designed to protect an occupant in an emergency situation of the vehicle, the occupant is fastened by a webbing having one end thereof wound up into a retractor, and when an emergency situation of the vehicle occurs, the body of the occupant is restrained by the webbing.

The retractor applies a predetermined tension to the webbing. However, the force for winding up the webbing is controlled so as to be relatively weak or zero in a normal state in order to prevent the occupant from feeling pressure from the webbing. Therefore, there may be a slight gap between the webbing and the occupant's body. For this reason, it may be expected that, when an emergency situation of the vehicle occurs, the body of the occupant will move by inertia toward the front end of the vehicle by a distance corresponding to the gap during a period of time which starts when the webbing is stopped from being unwound and which ends when the occupant's body is reliably restrained by the webbing.

In order to prevent the occupant's body from moving in an emergency situation of the vehicle, one type of apparatus has heretofore been proposed wherein, when an emergency situation of the vehicle occurs, the biasing force derived from, for example, a spiral spring is transmitted to a webbing take-up shaft, thereby applying tension to the webbing (see, e.g., the specification of Japanese Utility Model Laid-Open No. 162856/1983).

This type of conventional apparatus is arranged such that, when the vehicle is in a normal state, the webbing is biased in a direction in which it is wound up by the biasing force from a relatively small resilient member, whereas, when an emergency situation of the vehicle occurs, the biasing force from a relatively large resilient member is transmitted to the webbing take-up shaft, thereby forcing the shaft to wind up the webbing. Accordingly, after the biasing force of the relatively large resilient member has been applied to the take-up shaft at the time of an emergency situation, this force continuously acts on the shaft, and this is inconvenient to reuse this apparatus.

SUMMARY OF THE INVENTION

In view of the above-described circumstances, it is a primary object of the present invention to provide a tension apparatus for applying tension to a webbing which enables the large resilient member to be wound up after an emergency situation of the vehicle has ceased.

To this end, the present invention provides a tension apparatus in which a worm wheel is connected to a relatively large resilient member, and a worm is meshed with the worm wheel and rotated by means of a driving force, thereby winding up the resilient member. In addition, the arrangement is such that the worm can be separated from the worm wheel by the action of guide means and is engaged with the worm wheel only when the resilient member needs to be wound up.

DESCRIPTION OF THE PREFERRED EMBODIMENT

The present invention will be described hereinunder in detail with reference to the accompanying drawings.

Figure 1:
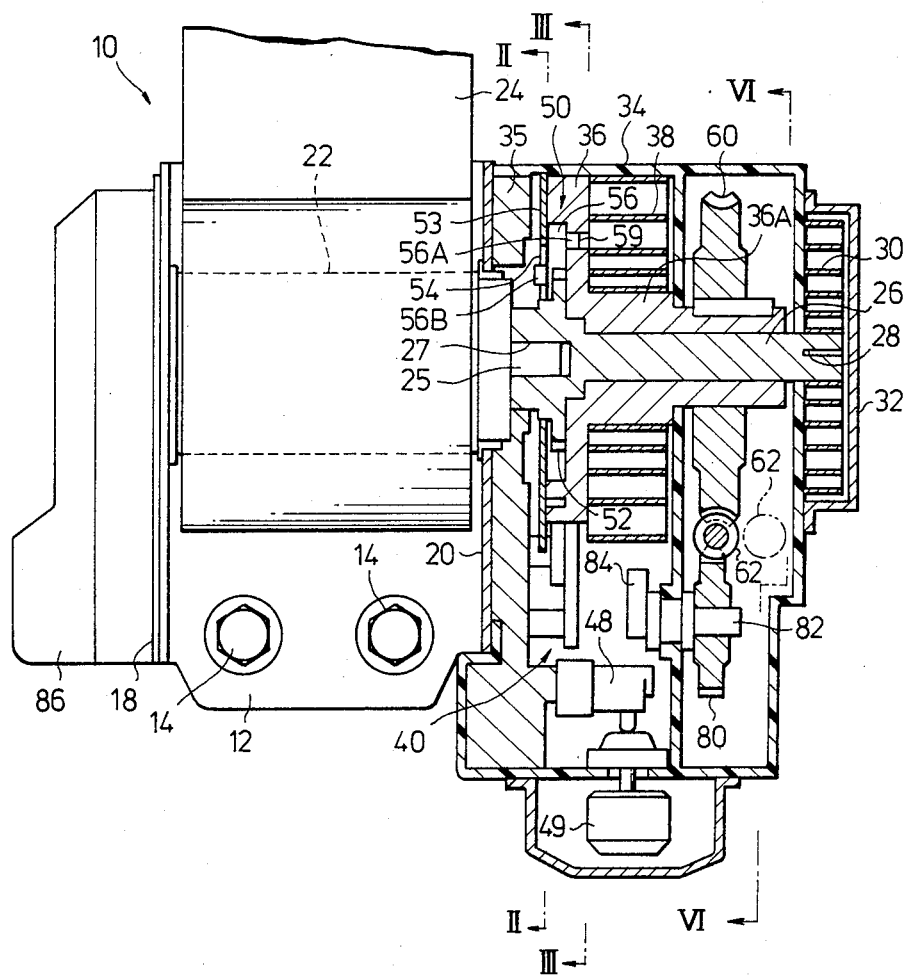
FIG. 1 is a sectional view of a webbing retractor to which one embodiment of the tension apparatus according to the present invention is applied.

FIG. 1 shows one embodiment in which the tension apparatus according to the present invention is incorporated in a webbing retractor 10.

The webbing retractor 10 has a frame 12 which is secured to the body of a vehicle by means of bolts 14. A pair of leg plates 18 and 20 respectively extend from both side portions of the frame 12 and rotatably support two end portions of a take-up shaft 22. One end of an occupant restraining webbing 24 is retained by the intermediate portion of the take-up shaft 22, and the other end of the webbing 24 is connected to a tongue plate (not shown). By engaging this tongue plate with a buckle device (not shown), the occupant can be fastened by the intermediate portion of the webbing 24.

The above-described arrangement is similar to that of conventional webbing retractors.

A shaft portion 25 which has a rectangular cross-section is formed at one end portion of the take-up shaft 22 which projects from the leg plate 20. The shaft portion 25 is inserted into a rectangular bore 27 provided in a connecting shaft 26, so that the connecting shaft 26 is coaxially connected to the take-up shaft 22. A slit 28 is cut in the distal end of the connecting shaft 26, and the inner end of a relatively small spiral spring 30 is retained by the slit 28. This spring 30 is accommodated in a small-spring casing 32, and the outer end of the spring 30 is retained by the casing 32.

The small-spring casing 32 is secured to the leg plate 20 through a large-spring casing 34 and a seat 35 which is brought into close contact with the leg plate 20. Thus, the small spiral spring 30 biases relatively weakly the take-up shaft 22 in the direction in which the webbing 24 is wound up (in the direction of the arrow A shown in FIGS. 2 and 3), thus serving to bring the webbing 24 into light contact with the body of an occupant when he is in a webbing fastened condition.

The cylindrical portion 36A of an actuating ring 36 is loosely fitted on the outer periphery of the connecting shaft 26 so that the ring 36 is able to rotate relative to the take-up shaft 22. The inner end of a relatively large spiral spring 38 is retained by the cylindrical portion 36A, while the outer end of the spring 38 is retained by the inner periphery of the casing 34.

The large spiral spring 38 applies a larger biasing force to the actuating ring 36 than the force of the small spiral spring 30. However, the ring 36 is prevented by a trigger means 40 from rotating in the webbing wind-up direction (indicated by the arrow A) when the vehicle is running in a normal state, but allowed to rotate in the webbing wind-up direction only when an emergency situation of the vehicle occurs.

Figure 3:
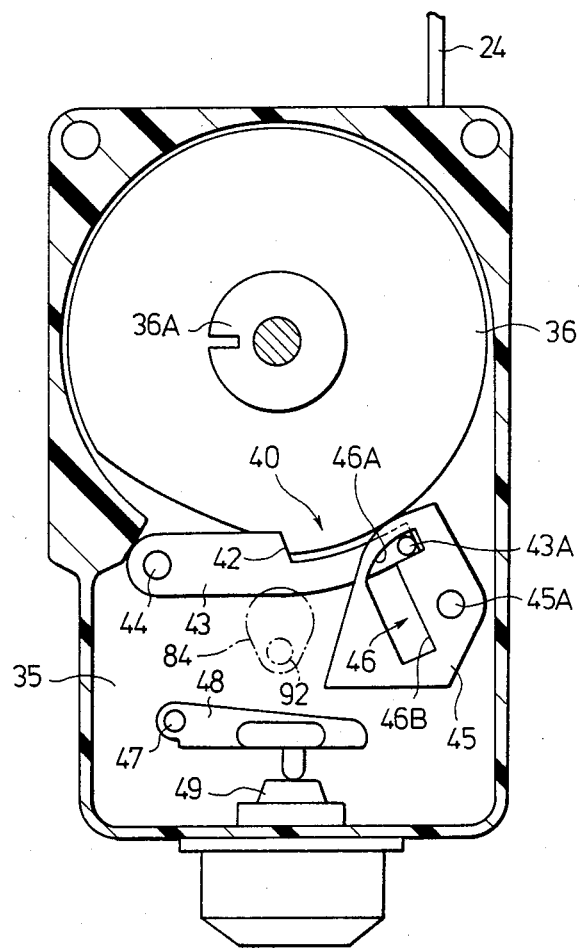
FIG. 3 is a sectional view taken along the line III—III in FIG. 1.
Figure 4:
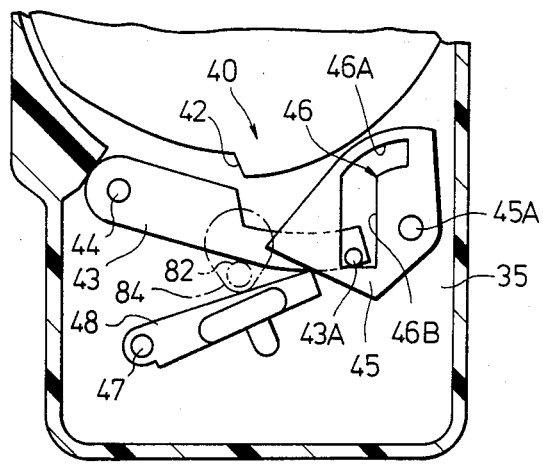
FIG. 4 shows an essential portion of the apparatus illustrated in FIG. 3 in an operative state.

In the trigger means 40, as shown in FIGS. 3 and 4, a pivoting pawl 43 is pivotally supported on the casing 34 through a pin 44, the pawl 43 being engageable with a notch 42 formed in the ring 36. The pawl 43 is controlled by a cam 45 so that, when an emergency situation of the vehicle occurs, the pawl 43 is separated from the actuating ring 36. More specifically, the cam 45 is pivotally supported on the casing 34 through a pin 45A, and a pin 43A which is provided on the pawl 43 is inserted into an L-shaped guide groove 46 formed in the cam 45. A sensor lever 48 which is pivotally supported on the seat 35 through a pin 47 opposes the cam 45 (they are preferably slightly spaced away from each other). This sensor lever 48 is mounted on a pendulum 49 which is suspended from the seat 35.

When the vehicle is in a normal condition, the cam 45 is in a state such as that shown in FIG. 3. Namely, a circular portion 46A which constitutes one side of the L-shaped guide groove 46 and extends along the circumference around the pin 45A is disposed in the tangential direction with respect to the actuating ring 36, and the pin 43A is accommodated within the circular portion 46A. Accordingly, when the vehicle is in a normal state, the pawl 43 is maintained in the engaged state with the ring 36. However, when an emergency situation of the vehicle occurs, the sensor lever 48 is pushed up by the pendulum 49 which swings when sensing an abnormal increase in the acceleration acting on the vehicle. In consequence, the cam 45 is pivoted in such a manner that the longitudinal axis of a releasing groove 46B which constitutes the other side of the guide groove 46 extends in the direction in which the pin 43A moves when the pawl 43 pivots about the pin 44. Thus, the pin 43A moves within the groove 46B, thereby allowing the pawl 43 to separate from the ring 36.

The pawl 43 is maintained in engagement with the notch 42 of the actuating ring 36 by means of a relatively weak biasing force which is applied to the pawl 43 from a resilient member (not shown) in the direction in which the pawl 43 comes close to the ring 36. In addition, the sensor lever 48 is preferably provided with a snap action mechanism in which, when the lever 48 is pushed up slightly by the action of the pendulum 49, the lever 48 is abruptly pivoted after passing a boundary point.

A clutch means 50 is interposed between the actuating ring 36 and the take-up shaft 22 such that, when the vehicle is running in a normal state, the ring 36 and the take-up shaft 22 are separated from each other, whereas, when an emergency situation of the vehicle occurs, the rotational force from the ring 36 is transmitted to the take-up shaft 22.

Figure 5:
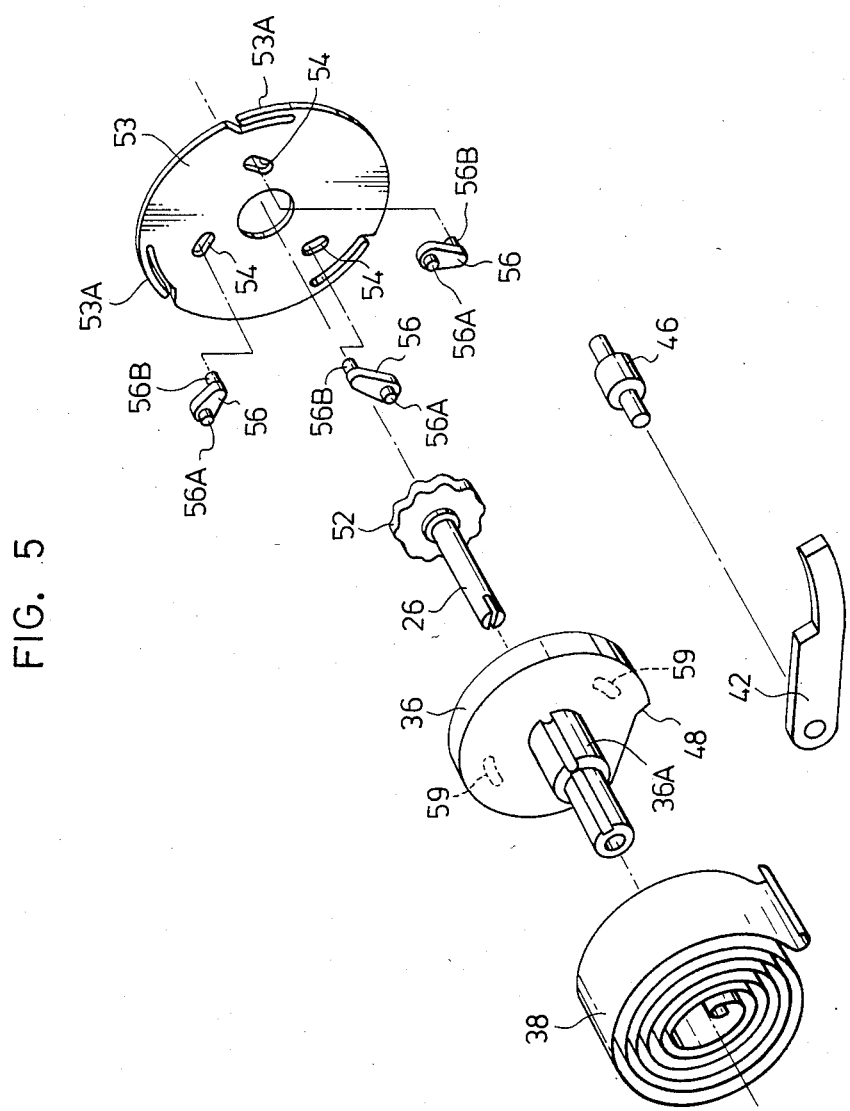
FIG. 5 is an exploded perspective view of clutch means employed in this embodiment.
Figure 6:
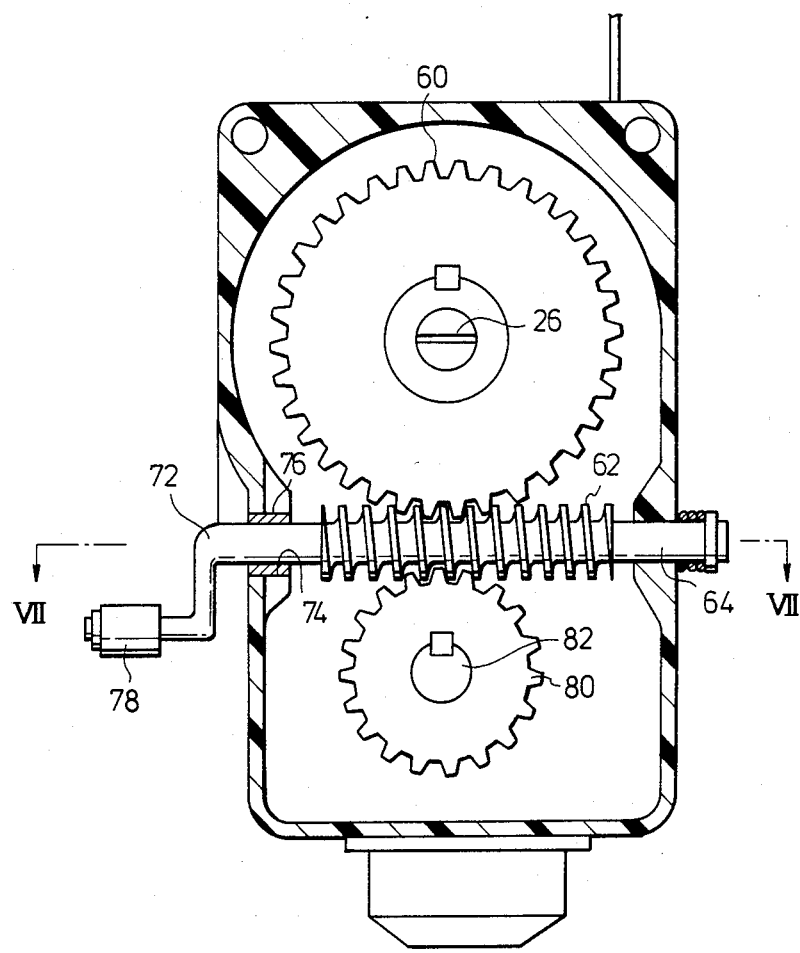
FIG. 6 is a sectional view taken along the line VI—VI in FIG. 1.

Referring to FIG. 5 which shows the clutch means 50, a gear wheel 52 is formed on the outer periphery of the end portion of the connecting shaft 26 connected to the take-up shaft 22, the gear wheel 52 having a plurality of recesses and projections formed on the outer periphery thereof. A friction plate 53 which serves as a clutch plate is provided so as to oppose the outer side of the gear wheel 52, the plate 53 having guide slots 54 for guiding levers 56 which are engageable with the gear wheel 52.

More specifically, the friction plate 53 is supported coaxially with the take-up shaft 22 so that the plate 53 is rotatable. However, arms 53A which are formed by partially cutting the outer periphery of the friction plate 53 are pressed against the seat 35, and the plate 53 therefore encounters frictional resistance when rotating. The levers 56 are pivotally supported by the actuating ring 36 through pins 56A which respectively project from the proximal protions of the levers 56 so as to be fitted into circular bores 59 provided in the ring 36.

Figure 2:
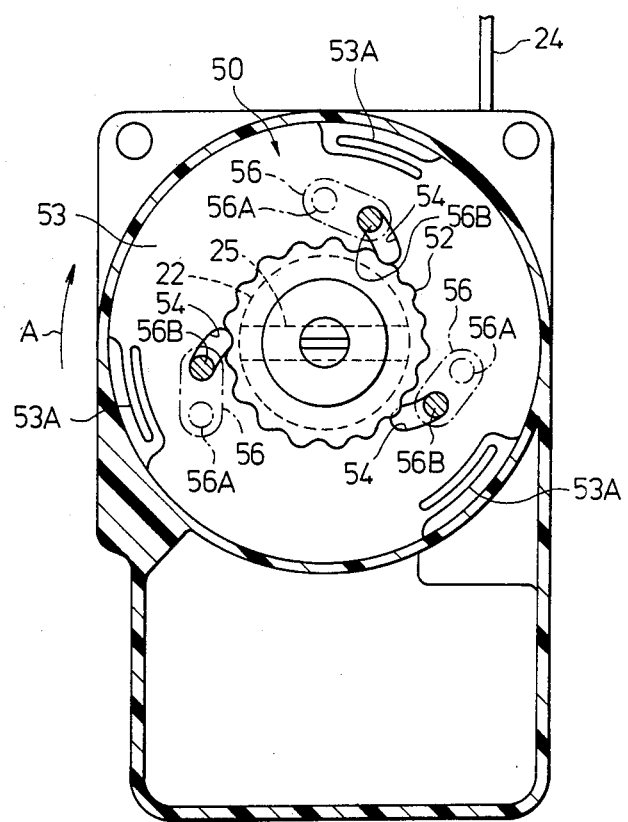
FIG. 2 is a sectional view taken along the line II—II in FIG. 1.

In addition, a pin 56B projects from the distal end portion of each of the levers 56 in the direction opposite to the pin 56A. This pin 56B is fitted into the corresponding guide slot 54 in the friction plate 53. When the vehicle is in a normal state, the friction plate 53 places the pins 56B at the outermost ends of the guide slots 54, respectively, as shown in FIG. 2, thereby separating the levers 56 from the gear wheel 52. However, when the actuating ring 36 rotates at the time of an emergency situation of the vehicle, the friction plate 53 guides the pins 56B along the respective guide slots 54. In consequence, the pins 56A are engaged with the gear wheel 52, thereby transmitting the rotational force from the actuating ring 36 to the levers 56 as compressive force, and thus rotating the gear wheel 52 in the direction in which the webbing 24 is wound up.

In the large-spring casing 34, a worm wheel 60 is provided between the large and small spiral springs 38 and 30 and is secured to the cylindrical portion 36A.

Figure 7:
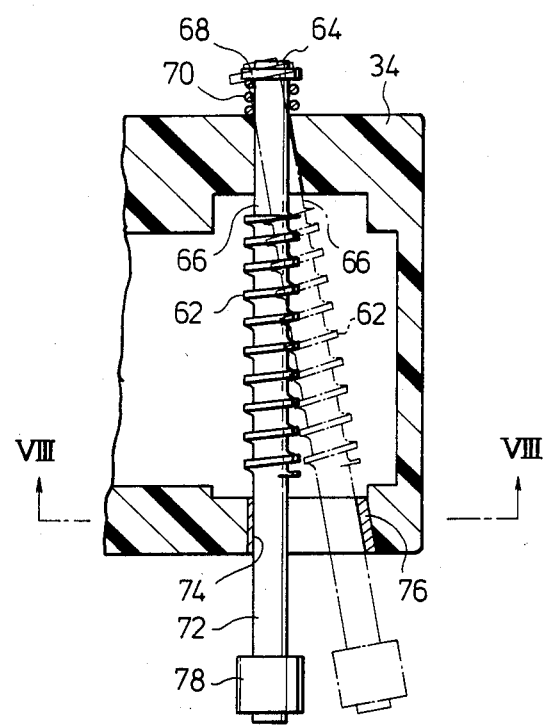
FIG. 7 is a sectional view taken along the line VII—VII in FIG. 6.

The worm wheel 60 opposes a worm 62 which is mounted on the casing 34. As shown in FIG. 7, the worm 62 has a smaller-diameter portion 64 which coaxially projects from one end thereof in the axial direction of the worm 62. The smaller-diameter portion 64 extends through a bearing bore 66 provided in the casing 34 in such a manner that the portion 64 is rotatably supported by the bore 66. In addition, a clip 68 for preventing the portion 64 from coming out of the bore 66 is mounted on the distal end portion of the smaller-diameter portion 64. A compression coil spring 70 is interposed between the clip 68 and the casing 34.

A smaller-diameter portion 72 projects from the other end of the worm 62 and extends through a bearing bore 74 provided in the casing 34.

Figure 8:
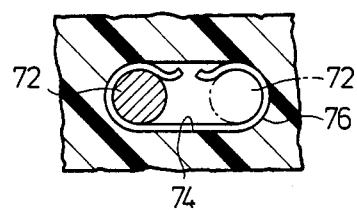
FIG. 8 is a sectional view taken along the line VIII—VIII in FIG. 7.
Figure 9:
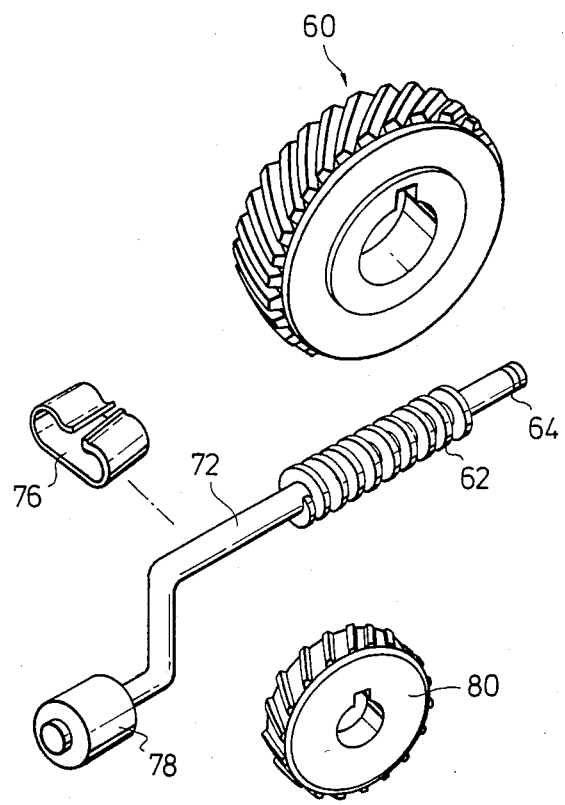
FIG. 9 is an exploded perspective view showing the relationship between a worm wheel and a worm employed in this embodiment.

As also shown in FIGS. 8 and 9, a guide 76 is mounted in the bearing bore 74. More specifically, the guide 76 is inserted into the bore 74 in the form of a slot so as to allow the smaller-diameter portion 72 to move from the position shown by the solid line in FIG. 8 to the position shown by the imaginary line. In order to retain the portion 72 at the two positions, retaining portions having a substantially C-shaped cross-section are formed at both ends of the guide 76. The guide 76 is preferably constituted by a resilient member such as a leaf spring so that the smaller-diameter portion 72 is allowed to move when a relatively large force is applied to the portion 72 in the radial direction thereof.

The distal end of the smaller-diameter portion 72 has a crank-like shape, and grip 78 is rotatably supported on the distal end portion thereof. The worm 62 is rotated by turning the grip 78 around the smaller-diameter portion 72.

When the smaller-diameter portion 72 is in the state shown in FIGS. 7 and 8, the worm 62 is in engagement with the worm wheel 60, so that, when the worm 62 is rotated, the large spiral spring 38 can be wound up. However, when the smaller-diameter portion 72 is shifted to the other side of the guide 76 as shown by the imaginary line in FIGS. 7 and 8, the worm 62 is separated from the worm wheel 60, so that, even when either the worm 62 or the worm wheel 60 rotates, no force is transmitted to the other.

As also shown in FIG. 1, a pinion 80 is provided on the side of the worm 62 which is remote from the worm wheel 60, the pinion 80 being rotatably supported on the casing 34 through a shaft 82. The pinion 80 engages with the worm 62 when the worm 62 engages with the worm wheel 60, and the pinion 80 is therefore able to transmit the rotational force from the worm wheel 60.

An elliptic cam 84 is secured to the distal end of the shaft 82. The cam 84 opposes the sensor lever 48, so that, when the worm wheel 60 rotates in a state wherein the sensor lever 48 has pivoted the cam 45 as shown in FIG. 4, the cam 45 to which the rotational force is transmitted from the worm wheel 60 forces the sensor lever 48 to be pushed down so as to return to the position shown in FIG. 3.

The pinion 80 is preferably subjected to frictional resistance or the like in order to prevent the pinion 80 from rotating when it is separate from the worm 62.

As shown in FIG. 1, an inertia-type lock mechanism 86 (the details of its structure are not shown) is provided between the leg plate 18 and the end of the take-up shaft 22 which projects from the leg plate 18, whereby, when an emergency situation of the vehicle occurs, the take-up shaft 22 is prevented from rotating in the direction in which the webbing 24 is unwound.

The following is a description of the operation of this embodiment.

When the vehicle is running in a normal state, the worm 62 is in the position shown by the imaginary line in FIGS. 7 and 8, so that the worm 62 is separate from the worm wheel 60 and the pinion 80.

When the occupant unwinds the webbing 24 from the take-up shaft 22 and fastens the webbing 24 to his body, the webbing 24 comes in light contact with the occupant's body, since the biasing force from the small spiral spring 30 is acting on the webbing 24. In a normal driving condition, the inertia type lock mechanism 86 is in an inoperative state, and it is therefore possible for the occupant to change his driving position as desired.

When the vehicle is in an emergency situation such as a collision, the pendulum 49 swings, and the sensor lever 48 is thereby pushed up. In consequence, the pivoting pawl 43 is pushed down by the action of the cam 45 so as to separate from the actuating ring 36, thereby allowing the ring 36 to be rotated in the webbing wind-up direction by means of the biasing force from the large spiral spring 38.

The rotation of the actuating ring 36 also causes the levers 56 to pivot so as to engage with the gear wheel 52 while being guided by the guide slots 54 in the friction plate 53 which is subjected to resistance to rotation through the arms 53A. Consequently, the ring 36 is connected to the gear wheel 52, and the biasing force of the large spiral spring 38 is thereby transmitted to the take-up shaft 22.

The worm wheel 60 rotates at the same time as the actuating ring 36 rotates in the manner described above. However, since the worm 62 is separated from the worm wheel 60, there is no risk of the worm 62 being rotated.

As a result, the take-up shaft 22 winds up the webbing 24 to apply tension to the webbing 24, thus eliminating a possible gap between the webbing 24 and the occupant's body. At the same time, inertia type lock mechanism 86 instantaneously stops the rotation of the take-up shaft 22 in the direction in which the webbing 24 is unwound. Accordingly, the occupant's body is tightly restrained by the webbing 24.

Since the energy stored in the large spiral spring 38 is released at the time of an emergency situation of the vehicle, the spring 38 needs to be wound up when it is reused.

In such a case, the occupant holds the grip 78 and moves the smaller-diameter portion 72 of the worm 62 from one end of the guide 76 to the position shown by the solid line in FIGS. 7 and 8. Consequently, the worm 62 is engaged with the worm wheel 60.

Then, the grip 78 is turned around the axis of the worm 62. In consequence, the rotation of the worm 62 is transmitted to the worm wheel 60, and the large spiral spring 38 is thereby wound up. When the amount by which the spring 38 is wound reaches a predetermined value, the pivoting pawl 43 is engaged with the notch 42 of the actuating ring 36 by means of the biasing force from a resilient member (not shown). When the pin 43A on the pawl 43 reaches the circular portion 46A in response to the return of the cam 45, the spring 38 is prevented from reversing.

At the same time, the pinion 80 which is also in engagement with the worm 62 causes the cam 84 to rotate. In consequence, the sensor lever 48 is pushed down about the pin 47 to return to the position shown in FIG. 3.

The cam 45 returns to the position shown in FIG. 3 from the position shown in FIG. 4 by gravity. In this case, however, a biasing means may be employed for turning the cam 45 in the clockwise direction.

If the arrangement is such that, when the energy stored in the large spiral spring 38 has been released, an alarm lamp is turned on, and when the spring 38 has completely been wound up by turning the worm 62 with the grip 78, the lamp is turnd off, then it is possible to instruct the occupant about the state of the spring 38.

Since the webbing retractor 10 can be returned to its previous state, the occupant can unfasten the webbing 24 and fasten it again later. In addition, when an emergency situation of the vehicle occurs next time, the occupant can be tightly restrained by the webbing 24 in a manner similar to the above.

Although, in the above-described embodiment, the worm 62 is turned by a manual operation using the grip 78, it is, of course, possible to rotate the worm 62 by means of driving force obtained from, for example, a motor.

As has been described above, in the tension apparatus according to the present invention, a first gear which is engageable with a second gear connected to a relatively large resilient member is made movable to a position which is spaced away from the second gear. It is therefore possible to wind up the resilient member after an emergency situation of the vehicle has ceased.

What is claimed is:

1. A tension apparatus for bringing a webbing into tight contact with the body of an occupant in an emergency situation of a vehicle, comprising:
   (a) a relatively small resilient member for applying a relatively weak biasing force to said webbing in a direction in which said webbing is wound up;
   (b) a relatively large resilient member for winding up said webbing with a relatively large resilient force when an emergency situation of the vehicle occurs;
   (c) a worm wheel connected to said large resilient member and rotated so as to wind up it;
   (d) a worm adapted to engage with said worm wheel and rotate it for winding up said large resilient member; and
   (e) guide means for allowing said worm to be moved between a position at which it is engaged with said worm wheel and a position at which it is separated therefrom, whereby said worm is engaged with said worm wheel only when said large resilient member is to be wound up, said worm being separated from said worm wheel when an emergency situation of the vehicle occurs, thereby promptly transmitting the force from said large resilient member to said webbing so as to be tensed.

2. A tension apparatus according to claim 1, wherein said guide means allows said worm to be radially pivoted about one end thereof.

3. A tension apparatus according to claim 2, wherein the other end of said worm is retained by said guide means selectively at said two positions.

4. A tension apparatus according to claim 3, wherein said guide means has a C-shaped portion for retaining the shaft of said worm.

5. A tension apparatus according to claim 4, wherein said guide means is constituted by a leaf spring provided so as to oppose a shaft portion of said worm, said spring having at each end thereof said C-shaped portion for accommodating said shaft portion.

6. A tension apparatus according to claim 2, wherein one end of the shaft of said worm projects from a casing, and a pivot point is defined near this projecting end.

7. A tension apparatus according to claim 6, wherein the distal end of the projecting shaft portion of said worm is enlarged in diameter so as to prevent the shaft of said worm from coming out of said casing.

8. A tension apparatus according to claim 7, wherein the other end of the shaft of said worm defines a handle used to wind up said large resilient member.

9. A tension apparatus according to claim 1, further including acceleration sensor for releasing the energy stored in said large resilient member when an emergency situation of the vehicle occurs, and a gear for resetting said acceleration sensor wherein, when said worm is engaged with said worm wheel, said worm is also engaged with said gear for resetting said acceleration sensor.

10. A tension apparatus for tensing a webbing in an emergency situation of a vehicle, comprising:
    (a) a frame secured to the body of the vehicle;
    (b) a take-up shaft rotatably supported by said frame to wind up said webbing;
    (c) a relatively small resilient member for biasing said take-up shaft with a relatively weak resilient force;
    (d) a relatively large resilient member for biasing said take-up shaft with a relatively strong resilient force so that said shaft winds up said webbing with a relatively large force;
    (e) trigger means for releasing the energy stored in said large resilient member when an emergency situation of the vehicle occurs;
    (f) clutch means for connecting said large resilient member to said take-up shaft when said trigger means works;
    (g) a worm wheel connected to said large resilient member;
    (h) a worm rotatably supported by said frame and adapted to engage with said worm wheel;
    (i) worm rotating means connected to said worm;
    (j) guide means for allowing said worm to be moved between a position at which it is engaged with said worm wheel and a position at which it is separated therefrom; and
    (k) retaining means for selectively retaining said worm at said two positions.

11. A tension apparatus according to claim 10, wherein said guide means allows said worm to be radially pivoted about one end thereof.

12. A tension apparatus according to claim 10, wherein said retaining means allows said worm to be released from the retaining when the shaft of said worm is moved in the radial direction thereof.

13. A tension apparatus according to claim 12, wherein said retaining means is a leaf spring which clamps a portion of the shaft of said worm by biasing force.

14. A tension apparatus according to claim 13, wherein said leaf spring has at each end thereof a C-shaped portion for clamping the shaft portion of said worm.

15. A tension apparatus according to claim 10, wherein one end of the shaft of said worm projects from a casing, and a pivot point is defined near this projecting end, the distal end of the projecting shaft portion of said worm being enlarged in diameter so as to prevent the shaft of said worm from coming out of said casing.

16. A tension apparatus according to claim 10, wherein, the other end of the shaft of said worm defines a handle used to wind up said large resilient member.

17. A tension apparatus according to claim 10, further including an acceleration sensor for activating said trigger means when an emergency situation of the vehicle occurs is said sensor comprising an inertia mass and a lever, said inertia mass causing said sensor lever to turn when an emergency situation of the vehicle occurs, and a worm wheel for resetting said sensor lever is disposed so as to be engageable with said worm.

18. A tension apparatus according to claim 17, wherein said worm wheel for resetting said sensor lever is provided with a cam which causes said sensor lever to pivot so as to be reset when said worm is rotated.

19. A tension apparatus for intensifying the tension acting on a webbing used in a seatbelt system for a vehicle, comprising:
    (a) a relatively small spiral spring for biasing a webbing take-up shaft with a relatively weak force so that said shaft winds up said webbing with a relatively small force;
    (b) a relatively large spiral spring for biasing said take-up shaft with a relatively strong force when an emergency situation of the vehicle occurs so that said shaft winds up said webbing with a relatively large force;
    (c) a worm wheel connected to said large spiral spring after the energy stored in said large spiral spring has been released in order to wind up this spring;

(d) a worm subjected to a driving force for rotating said worm wheel so as to wind up said large spiral spring;

(e) retaining means for selectively retaining said worm in a position where it is engaged with said worm wheel and a position where it is separated therefrom.

20. A tension apparatus according to claim 19, wherein said retaining means includes a resilient member which clamps the shaft of said worm by means of biasing force.

* * * * *